United States Patent
Schneider

(10) Patent No.: US 9,152,442 B2
(45) Date of Patent: Oct. 6, 2015

(54) CALLBACKS IN VIRTUAL MACHINES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1824 days.

(21) Appl. No.: 12/202,205

(22) Filed: Aug. 29, 2008

(65) Prior Publication Data

US 2010/0058338 A1    Mar. 4, 2010

(51) Int. Cl.
- *G06F 9/455* (2006.01)
- *G06F 9/44* (2006.01)
- *G06F 9/54* (2006.01)

(52) U.S. Cl.
CPC .......... *G06F 9/45533* (2013.01); *G06F 9/4426* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 6,934,945 B1 * | 8/2005 | Ogilvy | 718/1 |
| 7,565,279 B2 * | 7/2009 | Bordes | 703/17 |
| 7,996,826 B2 * | 8/2011 | Park et al. | 717/148 |
| 8,032,897 B2 * | 10/2011 | Serebrin | 719/318 |
| 2009/0187904 A1 * | 7/2009 | Serebrin et al. | 718/1 |
| 2009/0204962 A1 * | 8/2009 | Diaz et al. | 718/1 |
| 2010/0138815 A1 | 6/2010 | Schneider | |

* cited by examiner

*Primary Examiner* — Gregory A Kessler
(74) *Attorney, Agent, or Firm* — Lowenstein Sandler LLP

(57) ABSTRACT

The use of callback functions when executing intermediate instructions in a virtual machine is described. The virtual machine receives and evaluates intermediate instructions. The virtual machine evaluates the instructions based on a function table referencing definitions of the functions. A callback is loaded into the virtual machine platform, and a callback loader modifies the function table to cause a function in the table to point to the callback instead of the standard definition. Thus, when the intermediate code is evaluated, it is evaluated based on the modified functionality of the callback rather than the standard definition.

22 Claims, 6 Drawing Sheets

CALLBACKS IN VIRTUAL MACHINES

FIELD

The invention is generally related to executing programs in a virtual machine, and more particularly to implementing callbacks for program execution in a virtual machine.

COPYRIGHT NOTICE/PERMISSION

At least a portion of the disclosure of this patent document contains material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2008, Red Hat, Inc., All Rights Reserved.

BACKGROUND

Many programming languages allow development of programs or applications that will be implemented in a virtual machine. The virtual machine is designed to allow "platform-independent" development. The basic principle of a virtual machine environment is that the executable code exists as "intermediate state," or intermediate form, code, or code in a state that still will be evaluated or interpreted by a virtual machine layer to essentially translate the program code into instructions executable on a hardware and operating system environment of the computing device on which the virtual machine executes. JAVA (of SUN MICROSYSTEMS of Sunnyvale, Calif.) is a well-known example. PERL (of the PERL FOUNDATION) is an example of a programming language that uses an intermediate state of code. Note that all trademarks used herein are used solely for purposes of identification of a source of a product. All trademarks are the property of their respective owners.

Programming languages that do not use a virtual machine layer or intermediate state code are implemented with a compiler that converts human-readable code written in the programming language into machine-executable code made up of instructions within an instruction set supported by a particular hardware and operating system environment, also referred to as a platform. Accordingly, such programming languages require, for each platform on which a program written in the program language is to be executed, separate compilers and separate compiling of human-readable code.

Virtual machines allow development of what is frequently referred to as "portable" code, or a "platform-independent" implementation. Platform-independent implementations allow human-readable code to be converted into a single format for execution on multiple platforms with a single compiler. The single compiler converts the human-readable code into an intermediate form, rather than into machine-executable instructions. The intermediate form is made up of a platform-independent instruction set, which instruction set is supported by the virtual machine. The virtual machine is effectively a virtual platform or architecture supporting the instruction set that makes up the intermediate form.

The virtual machine in turn is implemented on various platforms, where each implementation of the virtual machine is capable of executing the intermediate code. In this way, the intermediate code is platform independent, and execution of the intermediate code on a computing system is limited only by the existence of a virtual machine environment for a given platform. Thus, when a virtual machine is implemented for a given platform, that platform becomes automatically capable of executing all programs compiled into the intermediate form, without having to re-compile the human-readable, or source, code.

An example of a programming language that uses a virtual machine layer is JAVA. FIG. 1 illustrates an exemplary implementation of known virtual machines. Human-readable code, or source code 102 is processed by compiler 104, which converts source code 102 into an intermediate form, as shown by byte code 106. The compiling of source code 102 into byte code 106 is understood to take place at "design time," referring to some time before execution of the program.

At runtime, or a time or times when byte code 106 is executed by virtual machine 110, the individual instructions making up byte code 106 are evaluated within virtual machine 110 by reference to function table 120. Function table 120 stores, for each function, a reference to machine-executable function definition, such as 116. Thus, intermediate instruction 112 is evaluated as reference 114 to entry 122 in function table 120. Entry 122 in turn is evaluated as reference 124 to function definition 116.

While a virtual machine layer in the implementation of a programming language creates a great deal of flexibility, it does not provide all the flexibility that developers might desire. When a platform introduces new capabilities, a developer must wait until the virtual machine implementation for the platform is updated to use those capabilities if he wishes to gain their benefit. For example, if a given platform adds new instructions to support 64-bit arithmetic, but the virtual machine implementation of that platform remains limited to instructions for 32-bit arithmetic, a developer cannot use the new 64-bit instructions on that implementation. Also, there exists a great deal of "legacy" code for legacy programs that may have been developed in the past. While the executable or intermediate form of the code for the legacy programs may exist, sometimes the source code is not available. Thus, for legacy programs, it may not be possible in traditional systems to change the program in the virtual machine.

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

Figure 1:
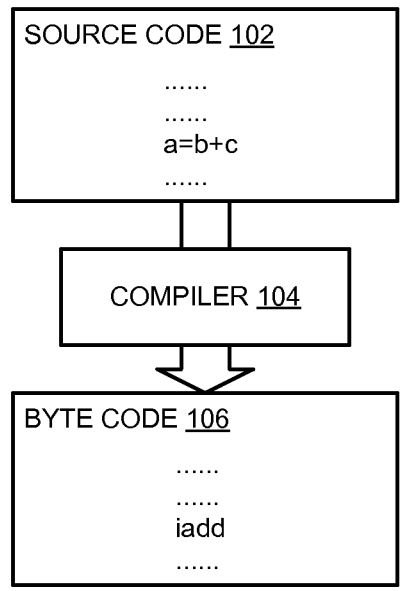
FIG. 1 is a block diagram of exemplary prior art system for generating intermediate instructions and executing the intermediate instructions on a virtual machine.
Figure 1:
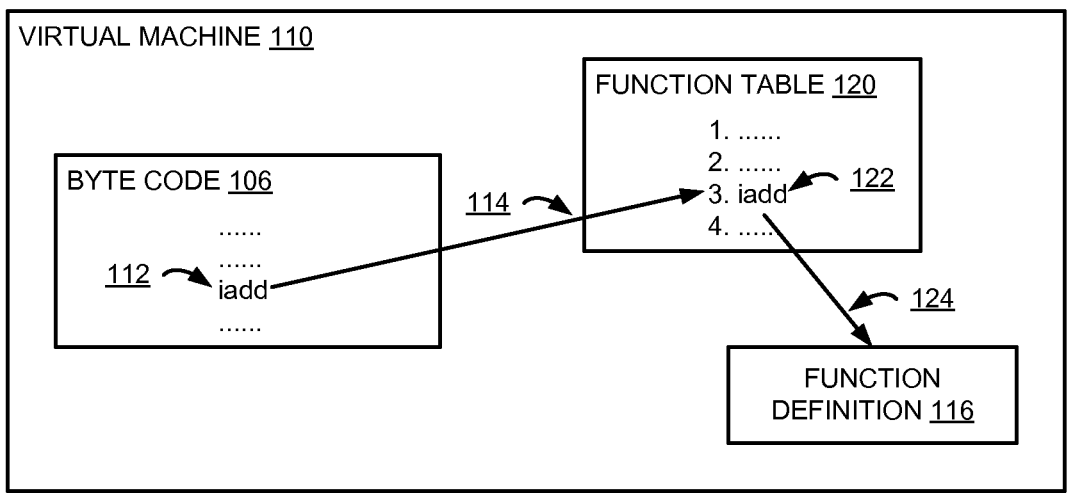

The use of callbacks in a virtual machine are described. A callback is loaded that has modified functionality as compared to a function of the virtual machine. A function table that references the function of the virtual machine is modified to reference the callback. Thus, during execution of a program in the virtual machine, an alternate definition for the selected function is used. The use of callbacks can thus enable modifications to legacy programs, even when the source code is unavailable.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein. Also, it may be convenient to construct a more specialized apparatus to perform the required operations of the method. Structure for a variety of these systems will appear as set forth in the description below. In addition, the present invention is not described with reference to any particular programming language. It will be appreciated that a variety of programming languages may be used to implement the teachings of the invention as described herein.

In general, the embodiments described below enable the use of callbacks within a virtual machine, where the callbacks are external to the virtual machine. The use of such callbacks is facilitated by modifying the references in the primitive table used by the virtual machine, such that selected references are redirected to the external callback function definition.

Enabling the use of callbacks adds additional flexibility to programming languages implemented with a framework where source code is compiled into an intermediate form that is evaluated at runtime by means of a virtual machine. Callbacks are programming mechanisms used in other programming language to, for example, pass a function as an argument to another function. Callbacks generally allow the passing of executable code to another piece of code. Callbacks are typically implemented as code external to a particular software environment that has a program that calls the callback. As described herein, a callback is implemented in a virtual machine to modify operation of a function within the virtual machine.

As mentioned above, such an implementation of a callback in a virtual machine may be useful, for example, in a situation where a developer has access to the intermediate code, but not the original source code, either because the original source code has been lost, or is in the hands of a third party that may have provided the developer with only the intermediate instructions. The use of callbacks in the virtual machine can enable updating or modifying the execution of certain functionality, without necessitating rewriting of the whole system.

Another situation in which callbacks in a virtual machine may be helpful is in taking advantage of updates to a platform that have not yet been incorporated into the implementation of a virtual machine for that platform. For example, a platform that previously supported only 32-bit arithmetic might add support for 64-bit arithmetic, by adding new machine instructions to the supported instruction set for that platform. The use of callbacks to redirect definitions for arithmetic primitives to use the new 64-bit machine instructions instead of the old 32-bit machine instructions allows a developer to quickly and conveniently use the platform advance, without having to implement an updated virtual machine.

In one embodiment, the reference table is modified in response to an operation of the virtual machine. Thus, the virtual machine can perform an operation that causes the callback loader to load a particular callback. In one embodiment, the operation of the virtual machine causes an exception, and modifying the reference table is part of handling the exception. Enabling the callback in response to an exception can allow the virtual machine to perform operations that would otherwise be outside the operation of the virtual machine.

In one embodiment, the callback causes the virtual machine to evaluate or execute certain intermediate instructions, or certain operations of the program. The intermediate instructions can be identified in the callback by reference to functions, calls, methods, or address space. Thus, some amount of intermediate instructions can be evaluated by operation of the callback. It will be understood that the program operations would be operations that may not normally be called to perform a certain function. Thus, a certain function can be executed, which points to a particular entry in the reference table, which references the callback. The callback can then cause other parts of the program to be executed by causing the virtual machine to evaluate certain intermediate instructions.

The following figures are described with reference to block diagrams and explanations as it might relate, for example, to the JAVA programming language. However, the descriptions and figures should be understood merely as examples, and are not limiting. One of skill in the art could understand to apply what is described herein to implement callbacks in an intermediate form of code in other programming languages, such as PERL. Thus, the teachings herein may be applied to any of a number of programming languages utilizing an intermediate form of code that that is evaluated at runtime by a virtual machine or a functional equivalent thereof.

Figure 2:
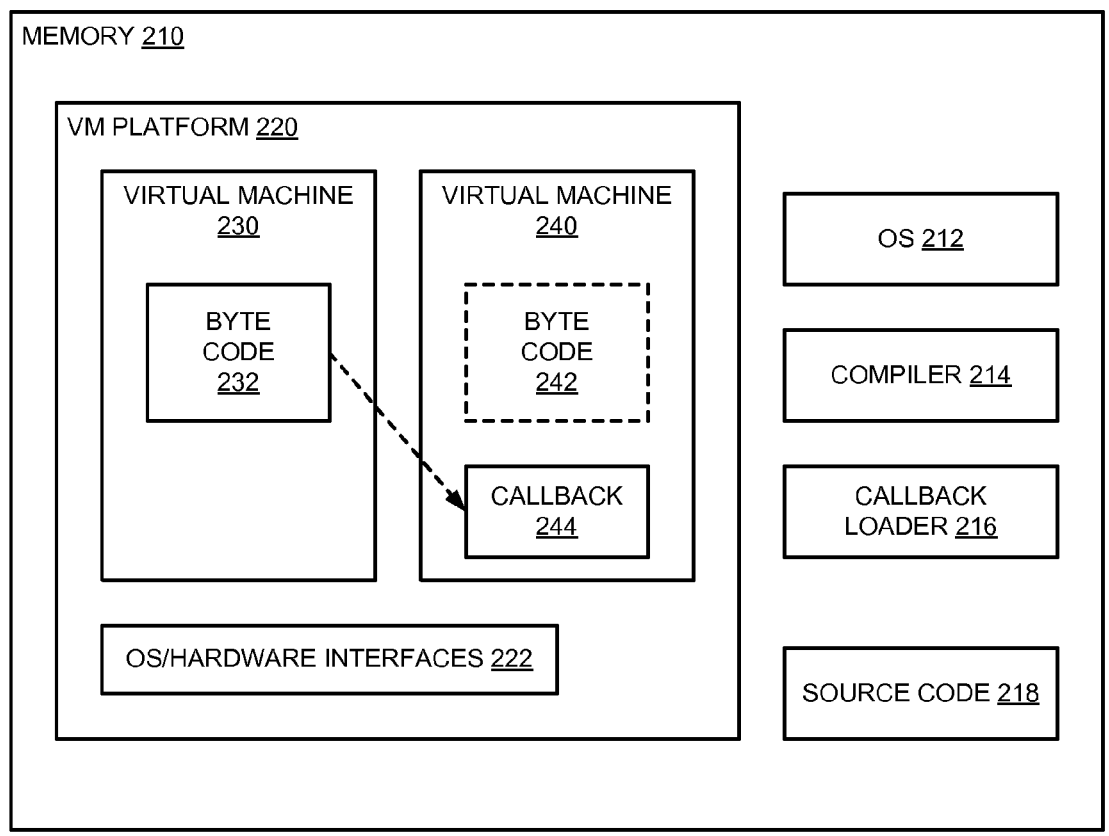
FIG. 2 is a block diagram of an embodiment of a system having a virtual machine platform with a virtual machine modified by a callback.

FIG. 2 is a block diagram of an embodiment of a system having a virtual machine platform with a virtual machine modified by a callback. System 200 may be any type of computing device or computing system or platform on which a virtual machine may be implemented. System 200 includes memory 210, or a storage device which can be, for example, main memory in a computer system. Memory 210 stores instructions that are executed by a processor (not shown) of the system.

Memory 210 includes OS (operating system) 212, which represents a software platform on which programs in system 200 execute. Programs in system 200 will generally be stored in and executed from memory 210. Memory 210 also includes compiler 214, which represents a program that generates intermediate code from source code 218. Source code 218 represents any type of source code that may be loaded onto system 200, or generated/developed on system 200. Specifically for purposes of discussion here, source code 218 may be understood as code developed for a programming language that utilizes intermediate code. Compiler 214 processes the human-readable instructions of source code 218 into intermediate, virtual-machine readable instructions. The intermediate instructions or code that is evaluated and executed on the virtual machines is illustrated by byte code 232 and byte code 234.

Callback loader 216 in memory 210 represents a module or a program that enables the loading of a callback into a virtual machine. Briefly, callback loader 216 loads the callback into memory, and causes the intermediate code to reference the callback. Thus, the callback is used for different functionality than a function within the virtual machine. The different functionality may be different functions as defined in the callback and/or the calling of portions of the intermediate code. In one embodiment, callback loader 216 is called in response to an operation of the virtual machine. Thus, the virtual machine may have logic or a function module that can call callback loader 216 to initiate the modification of a certain function. In one embodiment, the virtual machine could switch back to the unmodified functionality as well. Thus, the callback can be activated and deactivated to provide the functionality in the virtual machine.

Memory 210 includes VM (virtual machine) platform 220, which represents an engine or runtime environment on which virtual machines will execute. VM platform 220 enables execution of the intermediate code as referred to above and evaluates the code and implements executable machine code that the underlying hardware/software platform of system 200 can execute. VM platform 220 includes OS/hardware interfaces 222, which is an abstraction to generically represent mechanisms within the virtual machine environment to cause operations to be executed in OS 212, hardware of system 200, or another program executing on system 200 (not shown).

VM platform 220 is illustrated with two virtual machines, 230 and 240. Virtual machine 230 includes byte code 232, which represents the program or code that will be executed in virtual machine 230. Virtual machine 240 is illustrated with byte code 242 and callback 244. In one embodiment, byte code 242 represents a program to be executed in virtual machine 240, and callback 244 includes code that modifies functionality of byte code 242. Thus, callback 244 may be loaded and implemented on the same virtual machine as the program it modifies. Callback 244 may additionally or alternatively modify functionality in byte code 232 of virtual machine 230. In such a scenario, virtual machine 240 may be a second instance of virtual machine 230, or otherwise share configuration. In an implementation where callback 244 modifies byte code 232, byte code 242 may or may not be present in virtual machine 240. Thus, virtual machine 240 may simply be a container for callback 244. In any of these scenarios, callback 244 includes functional definitions that are different than would otherwise be implemented when evaluating the modified byte code on VM platform 220.

Figure 3:
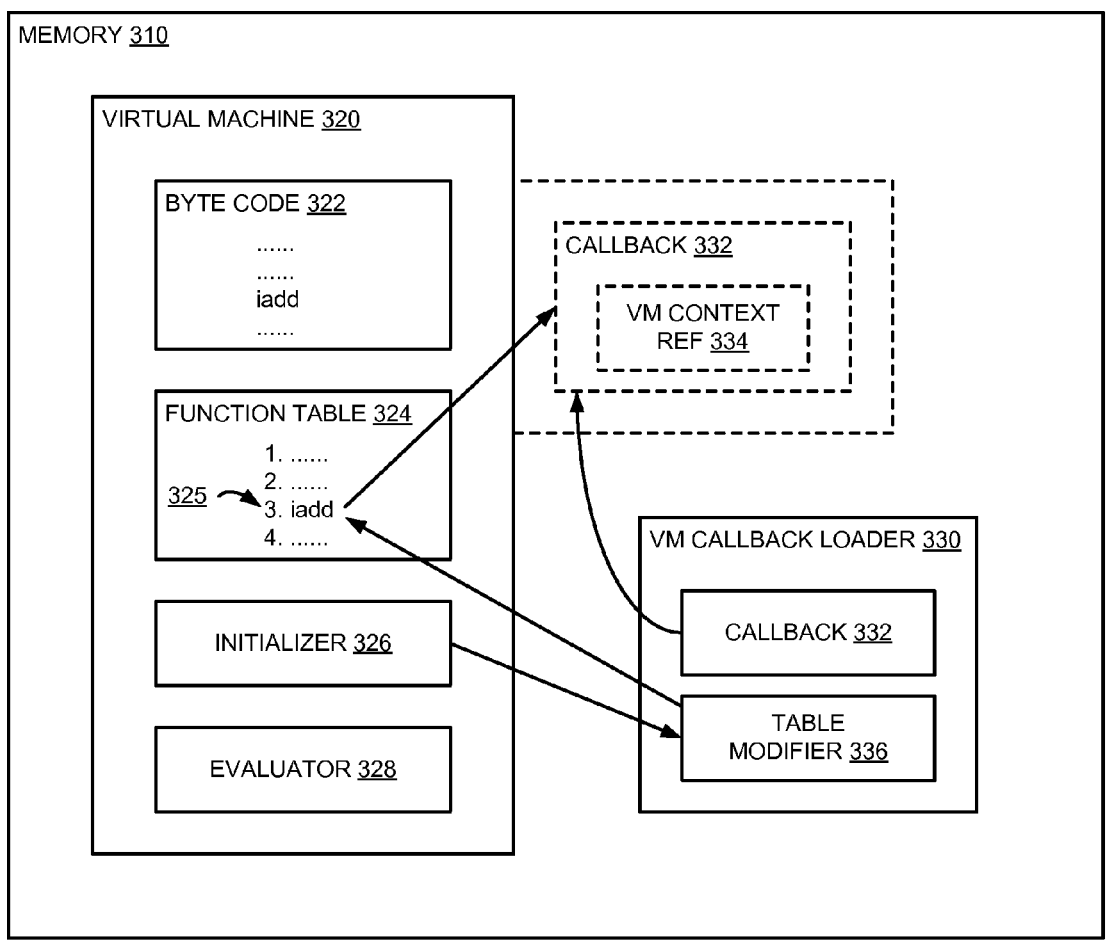
FIG. 3 is a block diagram of an embodiment of a system having a virtual machine that is initialized to include a callback.

FIG. 3 is a block diagram of an embodiment of a system having a virtual machine that is initialized to include a callback. System 300 may be any type of computing device or computing system or platform on which a virtual machine may be implemented. System 300 includes memory 310, which can be, for example, main memory in a computer system. Memory 310 stores instructions that are executed by a processor (not shown) of the system.

Memory 310 includes virtual machine 320, which executes a program represented by byte code 322. Byte code 322 includes intermediate instructions that will be evaluated by virtual machine 320 (on a virtual machine platform, not shown), and executed in system 300. Virtual machine 320 also includes function table 324, which includes various functions that may be called within byte code 322. In one embodiment, function table 324 is initialized to only include primitive functions, such as function 325, 'iadd'. Each function listed in function table 324 references a definition of the function within virtual machine 320.

Initializer 326 initializes virtual machine 320, which may include setting configuration values, initializing platform interfaces, etc. As part of the initialization, initializer 326 may make a function call to VM callback loader 330. VM callback loader 330 may be a standard function available within the programming language environment (such as an external call function built into PERL), or may be a module to enable loading callbacks into the virtual machine environment.

VM callback loader 330 includes callback 332 and table modifier 336. Callback 332 includes the code to implement the modified functionality within virtual machine 320. The modified functionality can include function definitions in the callback, as well as, or alternatively, intermediate instructions in the virtual machine. VM callback loader 330 stores or loads callback 332 into memory 310. The callback may be loaded into virtual machine 320, or a different virtual machine or other location in the virtual machine platform. Table modifier 326 represents code that modifies function table 324. Specifically, function 325 is changed to reference or point to callback 332 where it is loaded into the virtual machine platform. In one embodiment, VM callback loader 330 passes (for example, by table modifier 336) VM context reference (ref) 334 in callback 332. Initializer 326 may pass a VM context of virtual machine 320 to table modifier 336, which table modifier 336 can then use to access and modify function table 324. Table modifier 336 can then also store the reference to the context in callback 332.

Virtual machine 320 includes evaluator 328, which evaluates byte code 322 at runtime to execute a program. Evaluator 328 will use callback 332 in place of function 325 in evaluating the intermediate instructions, effectively changing the functionality of the program in virtual machine 320.

Figure 4:
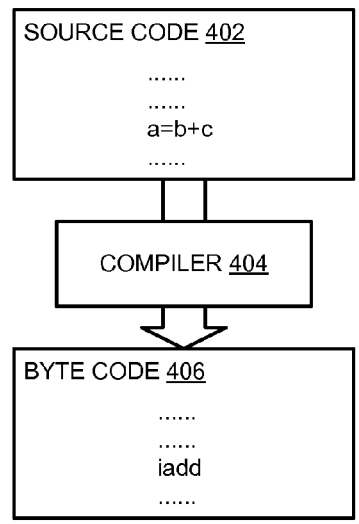
FIG. 4 is a block diagram of an embodiment of a representation of generating intermediate code, and a virtual machine that implements a callback.
Figure 4:
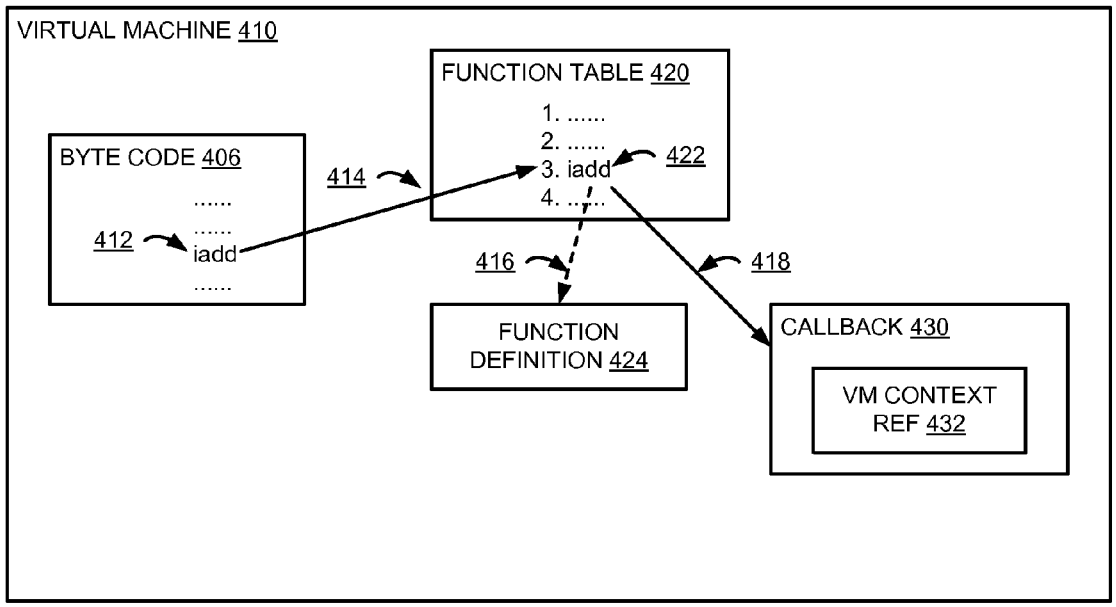

FIG. 4 is a block diagram of an embodiment of a representation of generating intermediate code and a virtual machine that implements a callback. Source code 402 is converted into intermediate form, byte code 406, by compiler 410. Such operation is either similar or the same as is known in the art. Virtual machine 410 is to evaluate and cause byte code 406 to execute. Byte code 406 includes instruction 412, which references a corresponding instruction in function table 420, with reference 414. In unmodified operation, entry 422 representing the corresponding instruction, makes reference 416 to function definition 424. However, in virtual machine 410, function definition 424 is redirected to modified functionality provided by callback 430. Thus, entry 422 no longer references function definition 424 within virtual machine 410, but instead has reference 418 to callback 430. Note that reference to the callback should persist as long as the virtual machine is operational. Thus, modification of byte code 406 in virtual machine 410 by callback 430 should be effective to modify the functionality for the entire time the program executes. The loading of the program can be modified to load callback 430 every time the program is loaded, which would be effective to modify every implementation of the program. Thus callback 430 could modify all operation of the program in virtual machine 410 with respect to the function represented at entry 422.

Callback 430 includes VM context reference 432, which is a reference to the context of virtual machine 410. Alternatively, or additionally, one or more arguments used to call callback 430 could pass context values. The context referenced by VM context reference 432 represents state and variable information of virtual machine 410. Access to state and variable information allows callback 430 to both return execution to the virtual machine, and to perform operations that have effect within the virtual machine.

Figure 5:
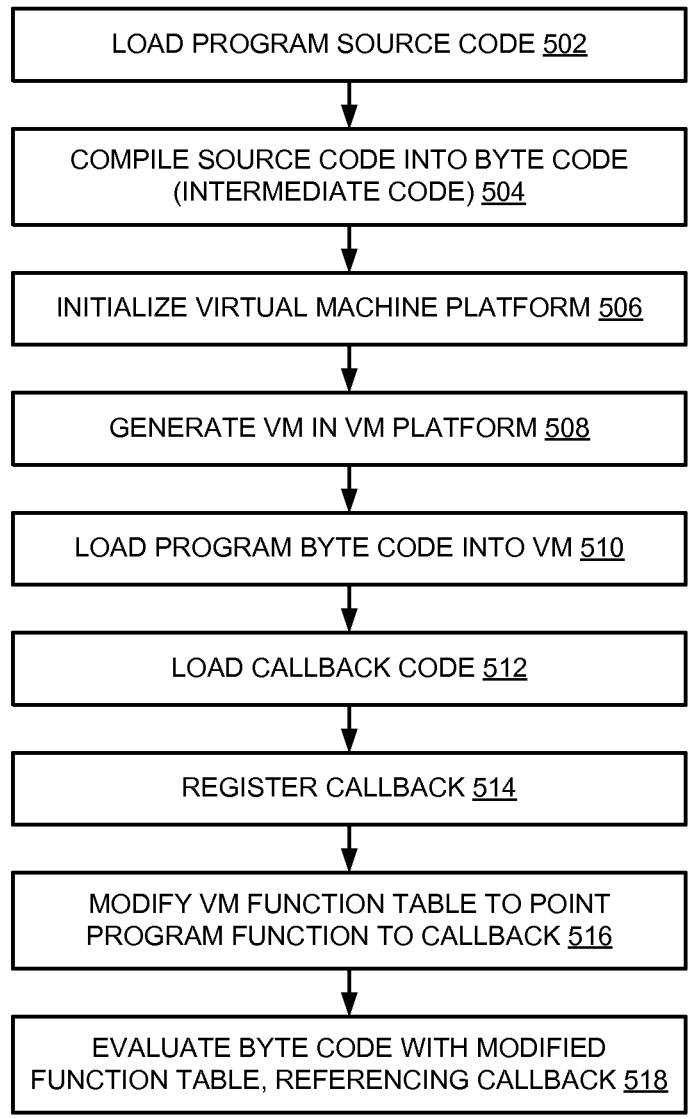
FIG. 5 is a flow diagram of an embodiment of a method for initializing a virtual machine with callbacks and executing intermediate instructions on the virtual machine using the callbacks.

FIG. 5 is a flow diagram of an embodiment of a method for initializing a virtual machine with callbacks and executing intermediate instructions on the virtual machine using the callbacks. The method or process may be performed by processing logic that may include hardware (e.g., circuitry, programmable logic, microcode, etc.), software (such as instructions run on a processing device), or a combination thereof. For convenience, reference is made to components that might perform one or more of the operations described below. Reference to particular components may not necessarily be exclusive, and other components not specifically called out may perform one or more of the following operations.

A compiler (e.g., compiler 224) loads program source code 502. The source code is represented as human-readable instructions. The compiler compiles the source code into byte code, or intermediate code, 504. The intermediate code is evaluated on a virtual machine. The source code represents a program for execution on a computing device, and the intermediate code is another form to represent the program. When the program is to be executed, a computing device on which the program is to execute (e.g., system 200) automatically loads a virtual machine platform, as is understood in the art. The virtual machine platform initializes itself, 506, and generates a virtual machine (VM) in the platform, 508. The virtual machine is also initialized.

A program loader on the computer device loads the program byte code into the virtual machine, 510. Initialization of the virtual machine may also include the loading of callback code, 512, as described herein. In one embodiment, the callback is registered, 514. The callback will be registered with the virtual machine or virtual machines whose functionality will be modified by the callback. The loading of the program may call a function or method that will dynamically register the callback. Registering the callback generically refers to configuring the virtual machine to recognize the callback.

A callback loader (e.g., 330) loads the callback and may pass VM context to the callback. The callback loader modifies function table in the affected virtual machine(s) to point a program function to the callback, 516. The virtual machine then evaluates the byte code with the modified function table, making reference to the callback, 518. The modifications to the function table should persist for the duration of the program and be limited to the virtual machine context. Thus, other instances of the program could be implemented, unmodified, in another virtual machine. Other programs may use the same callback, but would also need to load the callback by a separate initialization process to modify the virtual machine in which they are executed. Seeing the callback will be limited to the context in which it is loaded.

Figure 6:
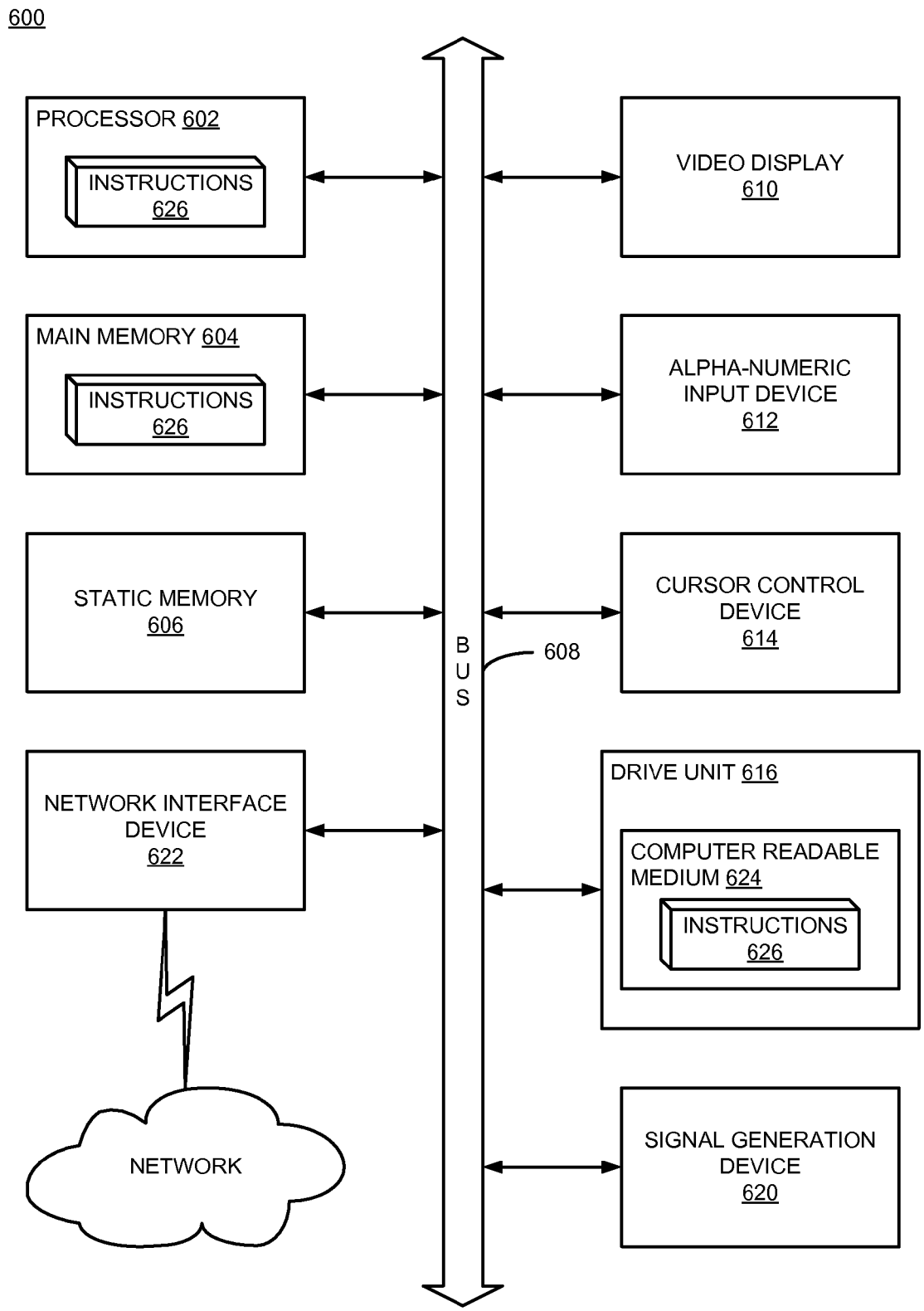
FIG. 6 is a block diagram of a computing device on which embodiments of the invention may be implemented.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 624 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine- or computer-readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method of executing intermediate instructions within a virtual machine comprising:

passing, to the virtual machine, a reference to the intermediate instructions, wherein the intermediate instructions represent human-readable instructions compiled into a form evaluable by the virtual machine, and the virtual machine evaluates the intermediate instructions by use of a table having a reference, for each of a plurality of functions, to machine-executable instructions implementing the function;

before executing on the virtual machine, initializing, by a processor, the virtual machine by modifying the table of references to redirect a selected reference, associated with a function, to a callback function to modify the functionality of the function, wherein the table of references is modified, at least in part, in view of a feature of supporting hardware; and evaluating the intermediate instructions at runtime in view of the modified table of references, comprising passing at least part of a context of the virtual machine to the callback function.

2. The method of claim 1, wherein the table of references is modified by machine-executable instructions external to the virtual machine, wherein the external machine executable instructions are invoked during initialization of the virtual machine.

3. The method of claim 1, wherein the table of references is modified in response to an operation of the virtual machine.

4. The method of claim 1, wherein the table of references is modified to reference the callback function having instructions to cause the virtual machine to evaluate certain intermediate instructions identified in the callback.

5. The method of claim 1, wherein the table of references is modified in view of customizable configuration data.

6. The method of claim 1, wherein the intermediate instructions are in the form of a syntax tree.

7. The method of claim 1, wherein the intermediate instructions are in the form of byte code.

8. The method of claim 1, wherein the function for which the associated reference is modified is one of a method call, a method return, a property read operation, a property write operation, or an exception.

9. The method of claim 1, wherein the function is a primitive function.

10. A non-transitory machine-readable storage medium comprising instructions to cause a processor to:

pass, to a virtual machine, a reference to intermediate instructions, wherein the intermediate instructions represent human-readable instructions compiled into a form evaluable by the virtual machine, and the virtual machine evaluates the intermediate instructions by use of a table having a reference, for each of a plurality of functions, to machine-executable instructions implementing the function;

before executing on the virtual machine, initialize, by the processor, the virtual machine by modifying the table of references to redirect a selected reference, associated with a function, to a callback function to modify the functionality of the function, wherein the table of references is modified, at least in part, in view of a feature of supporting hardware; and evaluate the intermediate instructions at runtime in view of the modified table of references, comprising passing at least part of a context of the virtual machine to the callback function.

11. The non-transitory machine-readable storage medium of claim 10, wherein the table of references is modified by machine-executable instructions external to the virtual machine, wherein the external machine executable instructions are invoked during initialization of the virtual machine.

12. The non-transitory machine-readable storage medium of claim 10, wherein the table of references is modified in response to an operation of the virtual machine.

13. The non-transitory machine-readable storage medium of claim 10, wherein the table of references is modified to reference the callback function having instructions to cause the virtual machine to evaluate certain intermediate instructions identified in the callback.

14. The non-transitory machine-readable storage medium of claim 10, wherein the intermediate instructions are in the form of a syntax tree or byte code.

15. The non-transitory machine-readable storage medium of claim 10, wherein the function for which the associated reference is modified is one of a method call, a method return, a property read operation, a property write operation, or an exception.

16. The non-transitory machine-readable storage medium of claim 10, wherein the function is a primitive function.

17. A computing device comprising:
a data storage device to store a virtual machine, the virtual machine to load intermediate instructions representing human-readable instructions compiled into a form executable by the virtual machine, the virtual machine having a function table to use in evaluating the intermediate instructions, the function table referencing a primitive function that comprises machine-executable instructions to implement the function; and a processor to execute a callback loader to load a callback function in the data storage device, and before executing on the virtual machine, initialize the virtual machine by modifying the function table, at least in part, in view of a feature of supporting hardware, to redirect the reference from the primitive function to the callback function, comprising passing at least part of a context of the virtual machine to the callback function, wherein the virtual machine evaluates the intermediate instructions at runtime in view of the modified function table.

18. The computing device of claim 17, wherein the callback loader comprises machine-executable instructions external to the virtual machine, invoked during initialization of the virtual machine.

19. The computing device of claim 17, wherein the callback loader modifies the function table in response to an operation of the virtual machine.

20. The computing device of claim 17, wherein the table of references is modified to reference the callback function having instructions to cause the virtual machine to evaluate certain intermediate instructions identified in the callback.

21. The computing device of claim 17, wherein the primitive function is one of a method call, a method return, a property read operation, a property write operation, or an exception.

22. The computing device of claim 17, wherein the callback loader loads the callback into the virtual machine.

* * * * *